(12) United States Patent
Xu et al.

(10) Patent No.: US 12,158,660 B2
(45) Date of Patent: Dec. 3, 2024

(54) OPTICAL MEMBRANE, BACKLIGHT MODULE AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Haifeng Xu, Beijing (CN); Kaiwen Wang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/272,568

(22) PCT Filed: Feb. 7, 2021

(86) PCT No.: PCT/CN2021/075780
§ 371 (c)(1),
(2) Date: Jul. 15, 2023

(87) PCT Pub. No.: WO2022/165798
PCT Pub. Date: Aug. 11, 2022

(65) Prior Publication Data
US 2024/0069385 A1   Feb. 29, 2024

(51) Int. Cl.
*G02F 1/13357* (2006.01)
*G02F 1/1335* (2006.01)
(52) U.S. Cl.
CPC .. *G02F 1/133611* (2013.01); *G02F 1/133607* (2021.01); *G02F 1/133608* (2013.01); *G02F 1/133605* (2013.01)

(58) Field of Classification Search
CPC .. G02B 6/0053; G02B 6/0088; G02B 6/0086; G02F 1/133615; G02F 1/133314; G02F 1/133317; G02F 1/133611; G02F 1/133607; G02F 1/133605; G02F 1/133608
See application file for complete search history.

(56) References Cited

U.S. PATENT DOCUMENTS

| 11,009,748 B2 * | 5/2021 | Lin ................. G02F 1/133606 |
| 2014/0268868 A1 * | 9/2014 | Hatta ............... G02F 1/133606 |
| | | 362/606 |
| 2016/0282548 A1 | 9/2016 | He |

(Continued)

FOREIGN PATENT DOCUMENTS

| CN | 203052433 U | 7/2013 |
| CN | 103424931 A | 12/2013 |

(Continued)

OTHER PUBLICATIONS

PCT/CN2021/075780 international search report.

*Primary Examiner* — Erin Kryukova
(74) *Attorney, Agent, or Firm* — IPro, PLLC

(57) ABSTRACT

An optical membrane, a backlight module and a display device are disclosed. The optical membrane includes a membrane body and at least two lugs, and the lugs are connected to two opposite sides of the membrane body and form an integral structure with the membrane body. Grooves are provided in connection lines between the lugs and the membrane body, and the grooves extend along the connection lines.

13 Claims, 5 Drawing Sheets

(56) References Cited

U.S. PATENT DOCUMENTS

| | | | |
|---|---|---|---|
| 2016/0291385 A1* | 10/2016 | Yoshikawa | G02F 1/133504 |
| 2016/0356952 A1* | 12/2016 | Kawabata | F21V 17/00 |
| 2017/0123145 A1* | 5/2017 | Jeon | G02B 6/0055 |
| 2018/0231709 A1* | 8/2018 | Chen | G02F 1/133615 |
| 2019/0041571 A1* | 2/2019 | Sugimoto | G02F 1/1333 |
| 2019/0121019 A1 | 4/2019 | Chen | |

FOREIGN PATENT DOCUMENTS

| | | | | |
|---|---|---|---|---|
| CN | 103697414 A | | 4/2014 | |
| CN | 107726142 A | | 2/2018 | |
| CN | 107728380 A | * | 2/2018 | ........... G02B 6/0055 |
| CN | 210465931 U | | 5/2020 | |
| KR | 101003647 B1 | * | 12/2010 | |
| KR | 20120057388 A | * | 6/2012 | |
| KR | 20170035059 A | | 3/2017 | |
| KR | 20170079805 A | * | 7/2017 | |
| KR | 20180077635 A | * | 7/2018 | |
| KR | 102170995 B1 | * | 10/2020 | |
| WO | WO-2017017792 A1 | * | 2/2017 | ....... G02F 1/133308 |
| WO | WO-2017037856 A1 | * | 3/2017 | ....... G02F 1/133308 |

\* cited by examiner

OPTICAL MEMBRANE, BACKLIGHT MODULE AND DISPLAY DEVICE

CROSS REFERENCE TO RELATED APPLICATIONS

This application is a National Stage of International Application No. PCT/CN2021/075780, filed on Feb. 7, 2021, which is hereby incorporated by reference in its entirety.

TECHNICAL FIELD

The present disclosure relates to the technical field of display, and particularly to an optical membrane, a backlight module and a display device.

BACKGROUND

With the continuous development of display technologies, thin and narrow-border display products are increasingly favored. At present, commonly used display screens include liquid crystal displays (LCDs) and organic light-emitting diodes (OLEDs). LCDs have advantages such as low cost, high resolution and a long service life, and still occupy a certain market share.

Because liquid crystals are materials that cannot emit light, an LCD panel needs to cooperate with a backlight module to present an image. In order to enable the backlight module to provide backlight with sufficient brightness and uniform distribution, an optical membrane may be arranged in the backlight module. The optical membrane is fixed in the backlight module by arranging protrusions at an edge of a light guide plate and notches in corresponding positions of the optical membrane. After the optical membrane is placed on the light guide plate, the notches of the optical membrane may be clamped on the protrusions of the light guide plate, thereby playing a role in preliminarily positioning the optical membrane.

As an edge of the display screen is set to be narrower and narrower, a distance between the protrusion of the light guide plate and an edge of a display area is reduced, which will produce bright spots at the edge of the display area, affecting a display effect.

SUMMARY

In a first aspect, an embodiment of the present disclosure provides an optical membrane, including:
  a membrane body; and
  at least two lugs, connected to two opposite sides of the membrane body and forming an integral structure with the membrane body;
  where grooves are provided in connection lines between the lugs and the membrane body, and the grooves extend along the connection lines.

In some embodiments of the present disclosure, side wall surfaces of sides of the grooves close to the membrane body are flush with side wall surfaces of corresponding sides of the membrane body.

In some embodiments of the present disclosure, the grooves penetrate through the lugs along the connection lines.

In some embodiments of the present disclosure, the membrane body is rectangular, the two opposite sides of the membrane body are provided with the lugs, and each of the two opposite sides is connected to at least one of the lugs.

In some embodiments of the present disclosure, the membrane body is rectangular, three adjacent sides of the membrane body are provided with the lugs, and each of the three adjacent sides is connected to at least one of the lugs.

In some embodiments of the present disclosure, a depth of the groove is ⅓ to ½ of a thickness of the membrane body.

In some embodiments of the present disclosure, a width of the groove in a direction perpendicular to the corresponding connection line is 0.1 mm to 0.5 mm.

In some embodiments of the present disclosure, the optical membrane is a prism sheet or a brightness enhancement sheet.

In a second aspect, an embodiment of the present disclosure provides a backlight module, including: a back plate and any of the above optical membranes;
  where an edge of the back plate is provided with notches corresponding to lugs of the optical membrane, and the lugs of the optical membrane overlap the notches of the back plate.

In some embodiments of the present disclosure, the backlight module further includes:
  a light guide plate, located on the back plate, where the light guide plate includes a light incident surface and a light emergent surface, and the optical membrane is located on a side of the light emergent surface of the light guide plate; and
  a light bar, located on a side of the light incident surface of the light guide plate;
  where the lugs of the optical membrane are arranged at at least two opposite sides except that close to the light bar.

In some embodiments of the present disclosure, the grooves in the lugs are located in a side facing the light guide plate; or, the grooves in the lug are located in a side facing away from the light guide plate.

In some embodiments of the present disclosure, the backlight module further includes:
  an adhesive layer, located between the light guide plate and the optical membrane, where the adhesive layer is located on a side of the light guide plate close to the light bar.

In some embodiments of the present disclosure, the optical membrane includes a prism sheet and a brightness enhancement sheet; and
  grooves are arranged in the lugs of at least one optical membrane of the prism sheet and the brightness enhancement sheet.

In some embodiments of the present disclosure, the backlight module further includes:
  a diffusion sheet, located between the light guide plate and the optical membrane; and
  an adhesive frame, arranged around edges of the back plate, the light guide plate, the diffusion sheet and the optical membrane.

In a third aspect, an embodiment of the present disclosure provides a display device, including any of the above the backlight modules, and a display panel located at a light emergent side of the backlight module.

BRIEF DESCRIPTION OF FIGURES

In order to explain technical solutions of embodiments of the present disclosure more clearly, drawings which need to be used in embodiments of the present disclosure will be briefly introduced below. Obviously, the drawings introduced below are only some embodiments of the present disclosure. For those of ordinary skilled in the art, other drawings can be obtained according to these drawings without creative work.

DETAILED DESCRIPTION

Figure 1:
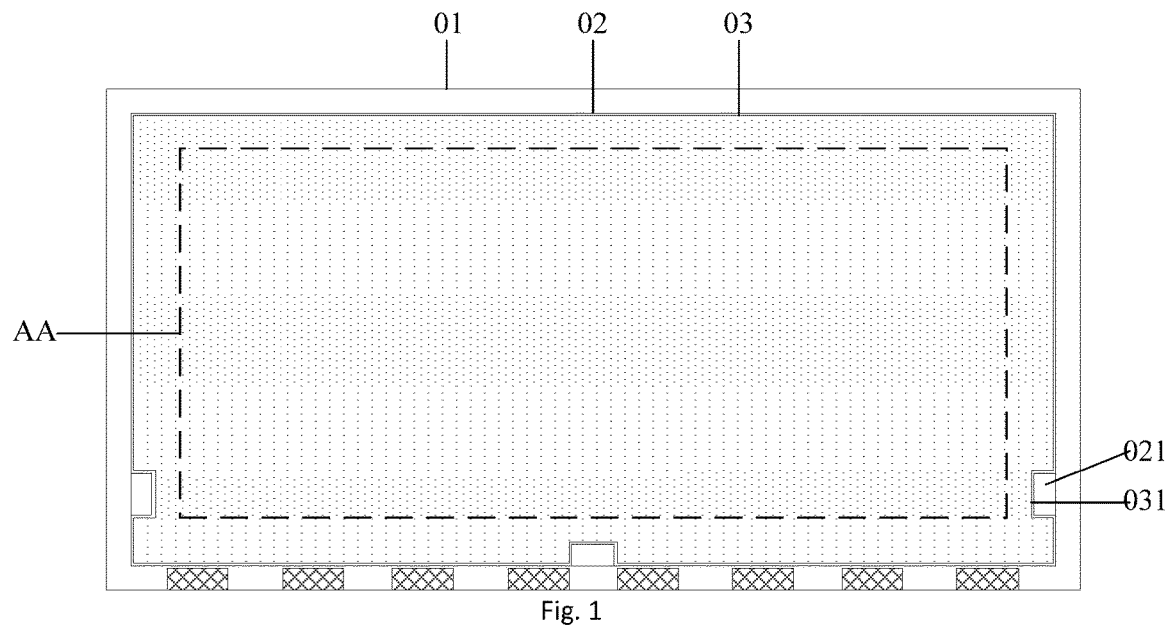
FIG. 1 is a schematic structural plan view of a backlight module in the related art.

In order to make the above purposes, features and advantages of the present disclosure more obvious and easier to understand, the present disclosure will be further explained with reference to the drawings and embodiments. However, implementations can be embodied in various forms and should not be construed as a limitation to the implementations set forth herein; on the contrary, these implementations are provided, so that the present disclosure will be thorough and complete, and will fully convey the concepts of implementations to those of the skilled in the art. In the drawings, the same drawing reference sign denotes the same or similar structures, and therefore repeated descriptions thereof will be omitted. Words expressing positions and directions described in the present disclosure are all illustrated by taking the drawings as an example, but they can be changed as needed, and all the changes are included in the protection scope of the present disclosure. The drawings of the present disclosure are only used to show relative position relationships, but do not represent true scales.

As a mainstream display screen at present, an LCD has advantages of low power consumption, a small size, low radiation and the like. A liquid crystal display panel is a non-self-luminous panel and needs to be used in conjunction with a backlight module.

The LCD is mainly composed of the backlight module and an LCD panel. The LCD panel itself does not emit light, and needs to rely on a light source provided by the backlight module to realize brightness display.

A development principle of the LCD is that liquid crystals are placed between two pieces of conductive glass, and driven by an electric field between two electrodes to cause an electric field effect of distortion of liquid crystal molecules, so as to control a transmission or shielding function for a backlight source, and thus display an image. If a color filter is added, a color image can be displayed.

In order to enable the backlight module to provide backlight with sufficient brightness and uniform distribution, an optical membrane may be arranged in the backlight module.

FIG. 1 is a schematic structural plan view of a backlight module in the related art.

As shown in FIG. 1, the backlight module generally includes a back plate 01, a light guide plate 02 located on the back plate 01, and an optical membrane 03 located on the light guide plate 02. In order to fix the optical membrane 03, protrusions 021 are arranged at an edge of the light guide plate 02, and notches 031 are arranged in corresponding positions of the optical membrane 03. After the optical membrane 03 is placed on the light guide plate 02, the notches 031 of the optical membrane may be clamped on the protrusions 021 of the light guide plate, thereby playing a role in preliminarily positioning the optical membrane 03.

Figure 2:
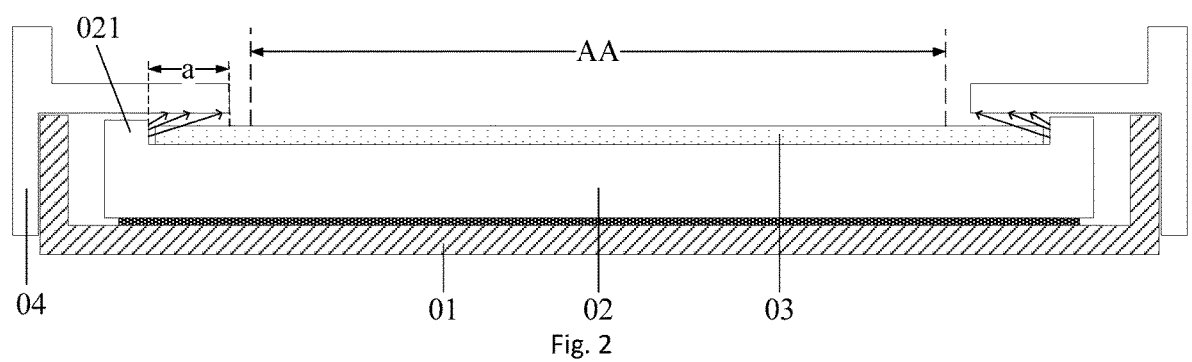
FIG. 2 is a first schematic structural cross-sectional diagram of a backlight module in the related art.
Figure 3:
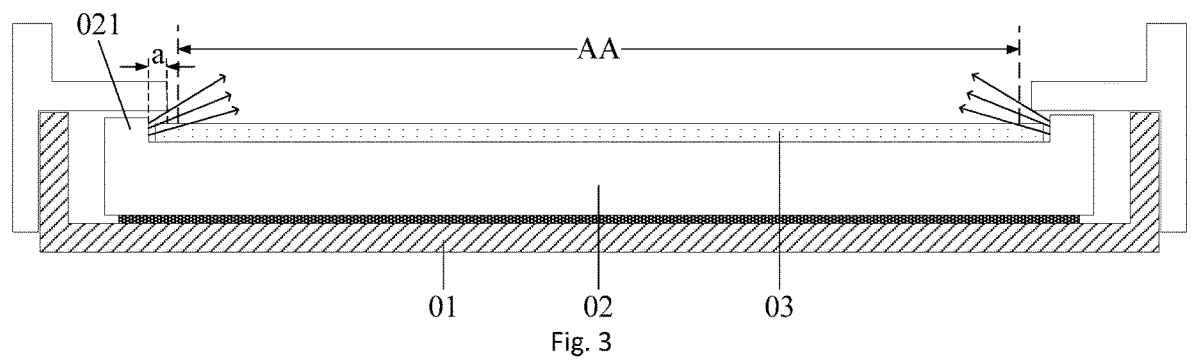
FIG. 3 is a second schematic structural cross-sectional diagram of a backlight module in the related art.

FIG. 2 is a first schematic structural cross-sectional diagram of a backlight module in the related art, and FIG. 3 is a second schematic structural cross-sectional diagram of a backlight module in the related art.

As shown in FIG. 2, the protrusions 021 at the edge of the light guide plate 02 are integrated with the light guide plate 02, so the protrusions 021 also have a light guiding function. Hence, in practical application, light may be emitted in a direction towards a display area AA after being acted by the protrusions 021, and a border 04 may cover edges of the light guide plate 02 and the optical membrane 03 because the border of a display device is wide, so that a distance a from the protrusion 021 of the light guide plate 02 to an edge of the border 04 is large. The light is not incident into the display area AA because the light led out by the protrusions 021 is shielded by the border.

As an edge of a display screen is set to be narrower and narrower, as shown in FIG. 3, the distance a from the protrusion 021 of the light guide plate 02 to the edge of the border 04 may also decrease, and a range of the display area AA may expand towards the edge, so that the light led out by the protrusions 021 can no longer be shielded by the border 04 and emitted to the display area AA, so that the edge of the display area where the protrusions 021 are arranged may produce bright spots, which will affect a display effect.

Figure 4:
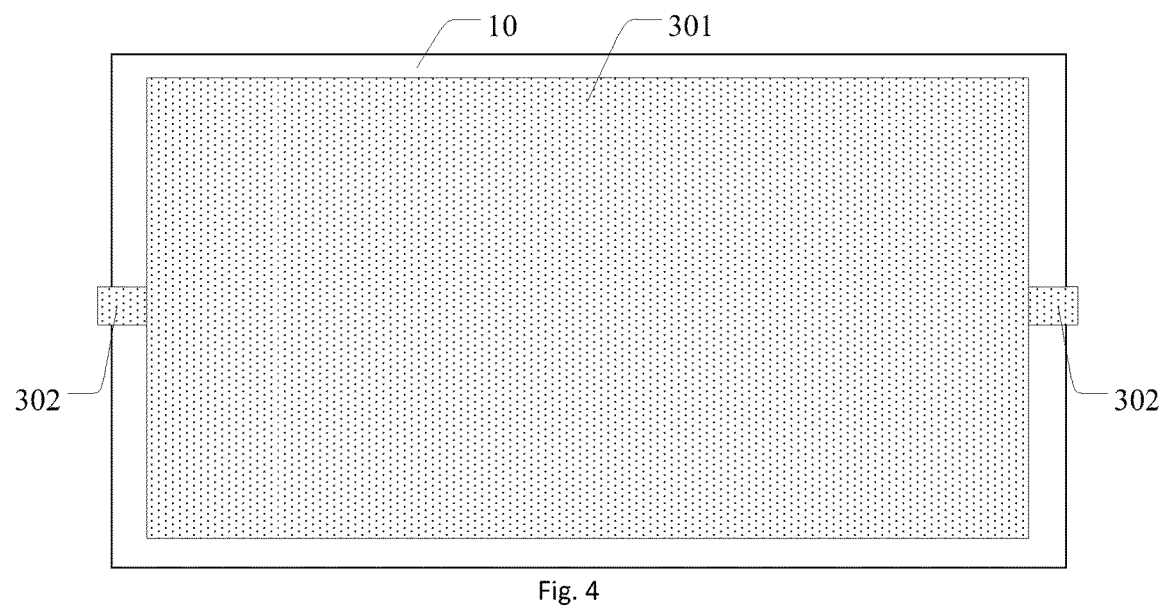
FIG. 4 is a first schematic structural plan view of an optical membrane according to an embodiment of the present disclosure.

In view of this, an embodiment of the present disclosure provides an optical membrane, and FIG. 4 is a first schematic structural plan view of an optical membrane according to an embodiment of the present disclosure.

As shown in FIG. 4, the optical membrane according to an embodiment of the present disclosure includes: a membrane body 301 and at least two lugs 302, where the lugs 302 are connected to two opposite sides of the membrane body 301 and form an integral structure with the membrane body 301.

The membrane body 301 and the lugs on the two sides thereof may be made by one-step molding. When the optical membrane is used in a backlight module, as shown in FIG. 4, a back plate 10 should also be provided with notches at positions corresponding to the lugs 302 of the optical membrane, so that the lugs 302 of the optical membrane can overlap the notches of the back plate 10, and preliminary fixing of the optical membrane can be realized.

Because the lugs 302 of the optical membrane are arranged on a side of the back plate far away from the display area AA, the lugs can be well applied to the display device with a narrow border, and no bright spots will be generated at the edge of the display area AA.

Figure 5:
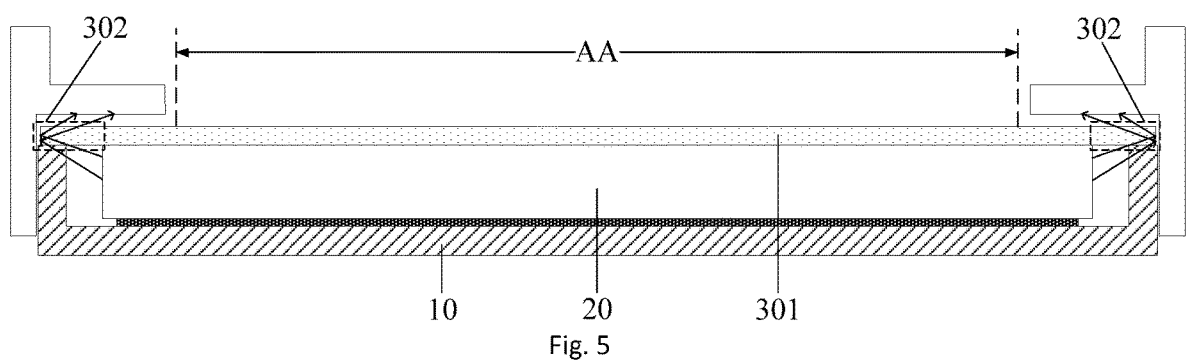
FIG. 5 is a first schematic structural cross-sectional diagram of a backlight module according to an embodiment of the present disclosure.

FIG. 5 is a first schematic structural cross-sectional diagram of a backlight module according to an embodiment of the present disclosure.

As shown in FIG. 5, because positions for the optical membrane to arrange the lugs 302 extend towards the side of the back plate 10 compared with other positions of the membrane body 301, light reflected by side walls of the lugs 302 may be shielded by the edge of the border and cannot enter the display area AA, but the side wall of the membrane body 301 in areas other than the lugs 302 is closer to the display area AA than the lugs 302. Therefore, the light reflected by the side wall of the membrane body 301 in the areas other than the lugs 302 can be incident into the display area AA, so that the edge of the display area AA may have shadows at the positions where the lugs 302 are arranged, which will affect the display effect.

Figure 6:
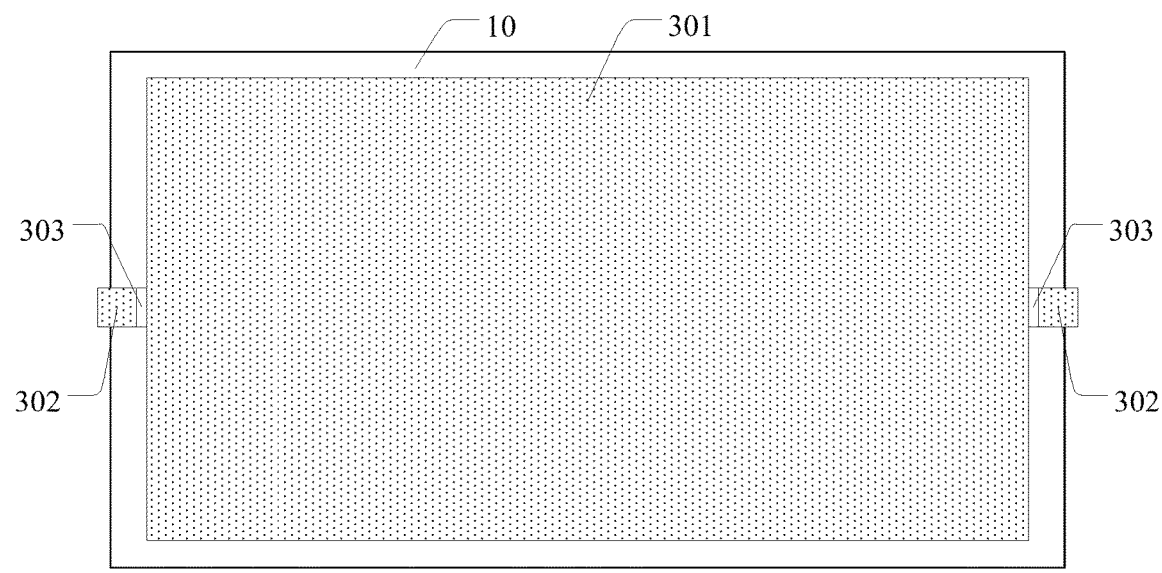
FIG. 6 is a second schematic structural plan view of an optical membrane according to an embodiment of the present disclosure.

In order to overcome the above problems, as shown in FIG. 6, which is a second schematic structural plan view of an optical membrane according to an embodiment of the present disclosure, grooves 303 are arranged in connection lines between the lugs 302 and the membrane body 301, and the grooves 303 extend along the connection lines.

Figure 7:
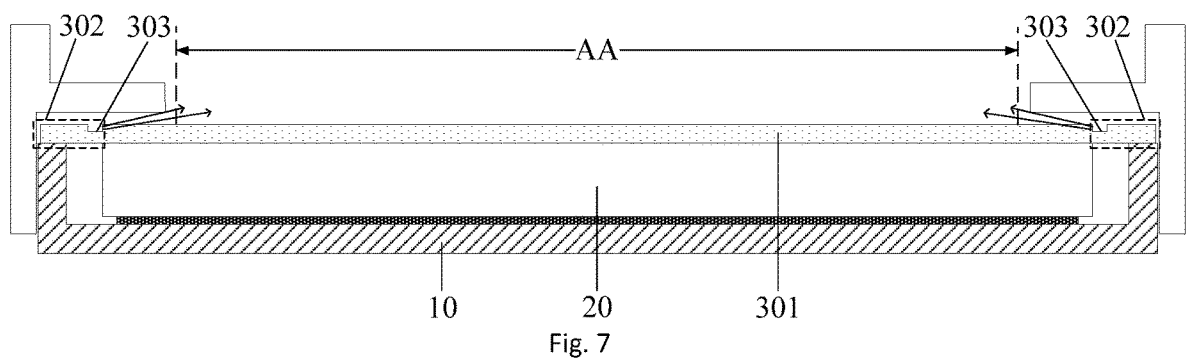
FIG. 7 is a second schematic structural cross-sectional diagram of a backlight module according to an embodiment of the present disclosure.

FIG. 7 is a second schematic structural cross-sectional diagram of a backlight module according to an embodiment of the present disclosure.

As shown in FIG. 7, after the grooves 303 are arranged in the connection lines between the lug 302 and the membrane body 301, side walls of the grooves 303 can reflect the light to the display area AA, so as to enhance a reflection effect of the light at the positions of the lugs 302, thereby improving brightness uniformity at the edge of the display area AA and avoiding a problem of generating shadows at the positions of the lugs.

As shown in FIG. 7, side wall surfaces of sides of the grooves 303 close to the membrane body 301 are flush with side wall surfaces of corresponding sides of the membrane body 301. The side wall of the groove 303 and the side wall of the membrane body 301 are on the same plane, so that the side wall of the membrane body 301 and the side wall of the grooves 303 can be flush for the surface reflecting the light, thereby making the brightness uniformity at the edge of the display area AA better.

As shown in FIG. 6, the grooves 303 arranged in joints between the lugs 302 and the membrane body 301 penetrate through the lugs 302 along the connection lines formed at the joints between the lugs 302 and the membrane body 301. That is to say, the grooves 303 arranged in the lugs 302 penetrate through entire widths of the lugs 302, so that the lugs 302 can form the grooves 303 flush with the side wall of the membrane body in entire width directions, thereby making the brightness uniformity at the edge of the display area AA better.

The grooves 303 in the lugs 302 can be made by a half-cutting process, and the lugs are half-cut along the side of the membrane body 301 with a cutter, thereby forming the grooves 303 in the positions where the lugs 302 are connected to the membrane body 301.

A depth of the groove 303 is ⅓ to ½ of a thickness of the membrane body. In this way, connection stability between the lugs 302 and the membrane body 301 can be ensured, and the side walls of the grooves 303 can enhance the reflection effect of light at the positions of the lugs 302 and improve the brightness uniformity at the edge of the display area AA.

A width of the groove 303 may be the same as a thickness of the used cutter. In an embodiment of the present disclosure, the width of the groove 303 in a direction perpendicular to the side of the membrane body is 0.1 mm to 0.5 mm. If the width of the groove 303 is too large, the strength of a connection area between the corresponding lug 302 and the membrane body 301 may be weakened, and the lug 302 may be broken if the lug 302 is collided during installation. If the width of the groove 303 is too small, the groove 303 is unfavorable to be manufactured. Therefore, an embodiment of the present disclosure sets the width of the groove 303 within an appropriate range to avoid the above problems.

Optionally, as shown in FIG. 6, the membrane body 301 of the optical membrane is generally rectangular, and the lugs 302 connected to the membrane body 301 are generally arranged at the two opposite sides of the membrane body 301, thereby ensuring the stability of the optical membrane when the optical membrane is fixed with the back plate 10. Each of the two opposite sides of the membrane body 301 can be connected to at least one of the lugs 302.

Figure 8:
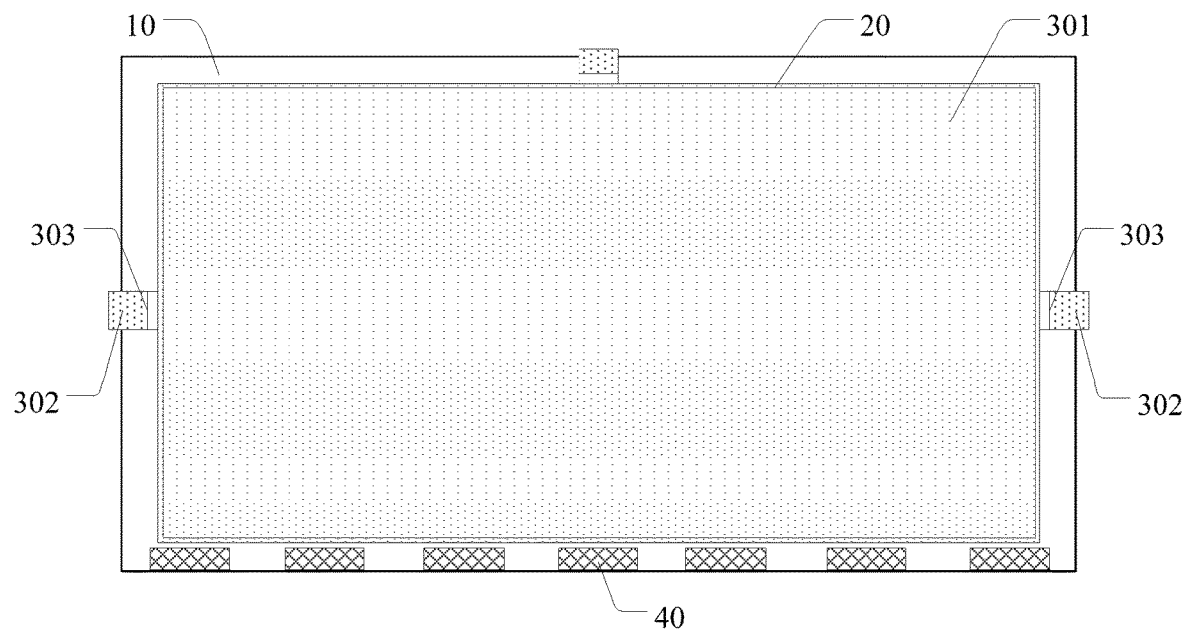
FIG. 8 is a schematic structural plan view of a backlight module according to an embodiment of the present disclosure.

FIG. 8 is a schematic structural plan view of a backlight module according to an embodiment of the present disclosure.

Optionally, as shown in FIG. 8, the lugs 302 may also be arranged at three adjacent sides of the membrane body 301, and each of the three adjacent sides of the membrane body 301 can be connected to at least one of the lugs 302. Therefore, the optical membrane can be positioned in two directions.

In practical application, the lugs 302 may be arranged at appropriate positions and in an appropriate number according to requirements, and an embodiment of the present disclosure does not limit arrangement positions and a specific arrangement number thereof.

In the backlight module, there are generally a variety of optical membranes, among which a prism sheet and a brightness enhancement sheet are used to improve the backlight brightness at a front view of angle, and at the same time, the prism sheet and the brightness enhancement sheet also have a function of adjusting a propagation path of light. Therefore, in an embodiment of the present disclosure, at least one of the prism sheet and the brightness enhancement sheet can be provided with the grooves in the joints between the lugs and the membrane body of the optical membrane to improve the brightness uniformity at the edge of the display area.

Figure 9:
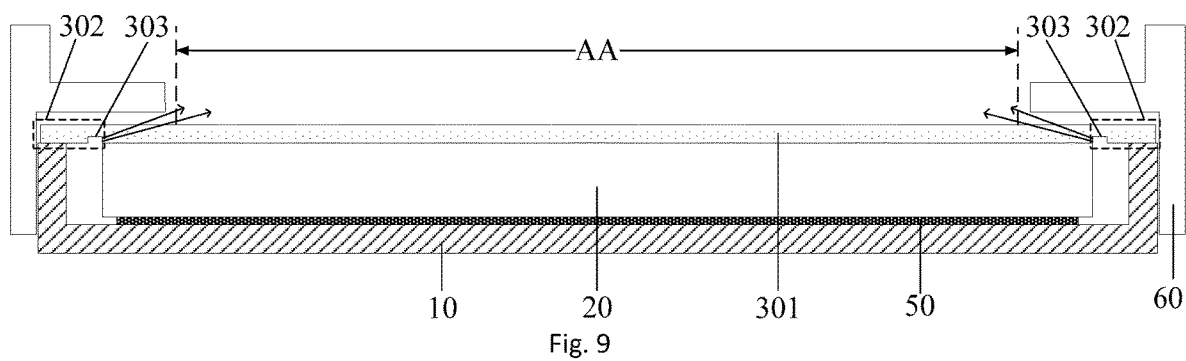
FIG. 9 is a third schematic structural cross-sectional diagram of a backlight module according to an embodiment of the present disclosure.

FIG. 9 is a third schematic structural cross-sectional diagram of a backlight module according to an embodiment of the present disclosure.

As shown in FIGS. 8 and 9, the backlight module according to an embodiment of the present disclosure includes a back plate 10, a light guide plate 20, an optical membrane and a light bar 40.

The back plate 10 is located at a bottom of the backlight module and has a supporting and bearing function. The back plate 10 is generally of a rectangular structure, and a shape of the back plate 10 adapts to a shape of the display device when the back plate 10 is applied to a special-shaped display device.

The back plate 10 is made of aluminum, iron, aluminum alloy or iron alloy or the like, which can play a role in heat dissipation. The back plate 10 is used for fixing and bearing the light source and the light guide plate 20, and also for fixing edge positions of components such as the optical membrane.

In an embodiment of the present disclosure, an edge of the back plate 10 is provided with a plurality of notches for overlapping the lugs of the optical membrane.

The light guide plate 20 is arranged on the back plate 10 for conducting light.

The light guide plate 20 may be made of an acrylic board or a polycarbonate PC board, or may be made of other transparent materials with a high refractive index and a low absorption rate, which is not limited here. An application principle of the light guide plate 20 is to make use of a total reflection property of light. When the light emitted by the light source is incident into the light guide plate at a set angle, due to the high refractive index of the light guide plate, the light is totally reflected when incident on the surface of the light guide plate, so that the light emitted by the light source can spread from one side of the light guide plate to the other side, and the line light source can be converted into a surface light source to provide backlight for the display panel.

On a bottom surface of the light guide plate, laser engraving, V-shaped cross grid engraving or UV screen printing technology can be used to form light guide dots. When the light hits each light guide dot, the reflected light may spread to all angles, and some of the light may no longer meet the total reflection condition when hitting an upper surface of the light guide plate, so the light can be emitted from a front of the light guide plate. By setting light guide spots with different densities and sizes, the light guide plate can emit light evenly.

The light bar 40 is located at a side of a light incident surface of the light guide plate 20, and is used as a backlight source.

Generally, one side of the light guide plate 20 is the light incident surface, and the light bar 40 may be arranged on the side of the light incident surface of the light guide plate 20. A plurality of light sources may be arranged on the light bar 40. In specific implementation, a Light Emitting Diode (LED) may be used as a light source, and the light source emits light facing the light incident surface of the light guide plate 20, so that the emitted light enters the light guide plate from the light incident surface of the light guide plate 20.

The optical membrane is located at a side of a light emergent surface of the light guide plate 20.

The optical membrane includes a membrane body 301 and at least two lugs 302, and the lugs of the optical membrane are arranged at at least two opposite sides except that close to the light bar. The lugs 302 are connected to two opposite sides of the membrane body 301, and form an integral structure with the membrane body 301.

The membrane body 301 and the lugs on the two sides of the membrane body 301 may be made by one-step molding. The positions of the notches in the back plate 10 correspond to the positions of the lugs 302 of the optical membrane. The optical membrane is arranged on the side of the light guide plate 20 facing away from the back plate 10, and the lugs 302 of the optical membrane overlap the notches of the back plate 10, so as to realize the preliminary fixing of the optical membrane.

The grooves 303 are provided in the connection lines between the lugs 302 and the membrane body 301, and the side walls of the grooves 303 can reflect light to the display area AA, so as to enhance the reflection effect of light at the positions of the lugs 302, thereby improving the brightness uniformity at the edge of the display area AA and avoiding a problem of generating shadows at the positions of the lugs.

In order to prevent bright lines at the edge, the light guide dots set at the edge of the light guide plate 20 may be sparse or even blank, and light intensity reflected from the bottom of the light guide plate 20 is weak compared with other positions. By matching the side wall of the light guide plate 20 with the side walls of the grooves 303 in the lugs 302 of the optical membrane to reflect light, backlight uniformity is improved.

As shown in FIG. 7, the grooves 303 in the lugs 302 may be arranged on the side of the optical membrane facing away from the light guide plate 20; optionally, as shown in FIG. 9, the grooves 303 in the lugs 302 may also be arranged on the side of the optical membrane facing the light guide plate 20. No matter which side the grooves 303 are set, the grooves can improve the brightness uniformity at the edge of the display area AA.

The backlight module further includes an adhesive layer, which is not shown in the figure and is located on the side of the light guide plate 20 close to the light bar 40 for bonding the light guide plate 20 and the optical membrane together.

The adhesive layer may be a double-sided adhesive tape, so that the optical membrane can be completely fixed in the backlight module through the lugs and the adhesive layer.

Figure 10:
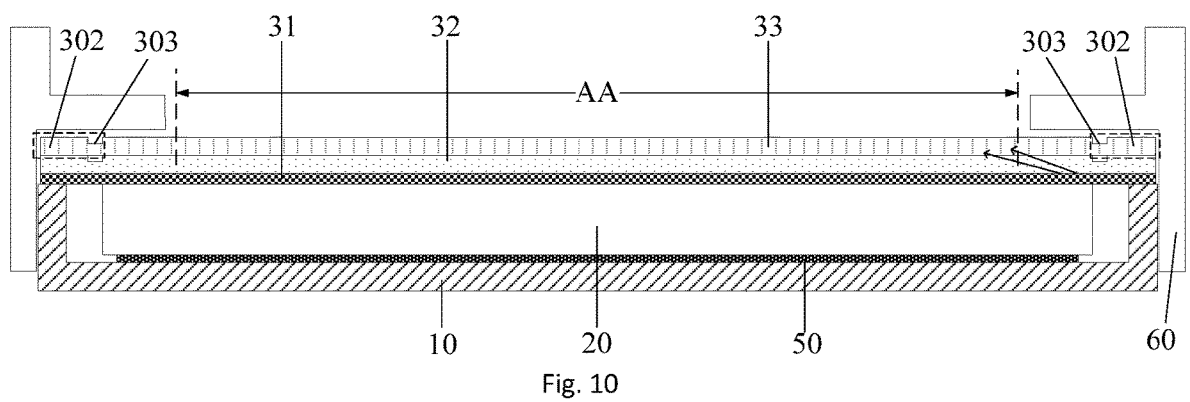
FIG. 10 is a fourth schematic structural cross-sectional diagram of a backlight module according to an embodiment of the present disclosure.

FIG. 10 is a fourth schematic structural cross-sectional diagram of a backlight module according to an embodiment of the present disclosure.

As shown in FIG. 10, the backlight module further includes a reflection sheet 50, a diffusion sheet 31 and an adhesive frame 60.

The reflection sheet 50 is located between the back plate 10 and the light guide plate 20.

The reflection sheet 50 can reflect the light emitted from the side of the light guide plate 20 facing away from the light guide surface to the light emergent side again, thereby improving a utilization rate of the light source.

The diffusion sheet 31 is located between the light emergent surface of the light guide plate 20 and the optical membrane.

A function of the diffusion sheet 31 is to scatter the incident light and make the light passing through the diffusion sheet 31 more uniform. The diffusion sheet 31 is provided with a scattering particle material, and when light enters the scattering particle material, the light will be refracted and reflected continuously, thereby achieving an effect of scattering the light and achieving the effect of light uniformity.

The optical membrane generally includes a prism sheet 32 and a brightness enhancement sheet 33 arranged on the side of the diffusion sheet 31 facing away from the light guide plate 20.

The prism sheet 32 can change an emergent angle of the light, thereby changing a viewing angle of the display device.

The brightness enhancement sheet 33 can improve the brightness of the backlight module, improve the utilization efficiency of light, and at the same time, make the emergent light have a property of polarization, thereby omitting use of a polarizer under the liquid crystal display panel.

In an embodiment of the present disclosure, grooves may be provided in the lugs of at least one of the optical membranes of the prism sheet 32 and the brightness enhancement sheet 33. For example, the grooves may be arranged only in the lugs of the prism sheet 32 or the lugs of the brightness enhancement sheet 33, or as shown in FIG. 10, the grooved may be provided in the lugs of both the prism sheet 32 and the brightness enhancement sheet 33.

In practical application, brightness of the edge of the display area needs to be uniform, therefore, the above effect can be achieved as long as the lugs of at least one of the optical membranes of the prism sheet 32 and the brightness enhancement sheet 33 are provided with the grooves.

The adhesive frame 60 is arranged around edges of the back plate 10, the light guide plate 20, the diffusion sheet 31 and the optical membranes (32 and 33).

The adhesive frame 60 protects the edges of the back plate, the light guide plate and the optical membrane, and can also fix the back plate, the light guide plate and the optical membrane together. In addition, the edge of the adhesive frame can also support the display panel.

An embodiment of the present disclosure takes a structure of a side-entry backlight module as an example to describe structures in the backlight module. The structure of the optical membrane according to an embodiment of the present disclosure can also be applied to a direct backlight module, which is not limited here.

Based on the same inventive concept, an embodiment of the present disclosure further provides a display device, the display device includes any of the above backlight modules and a display panel located at a light emergent side of the backlight module. The display device may be a mobile phone, a tablet computer, a television, a monitor, a notebook computer, a digital photo frame, a vehicle-mounted display, a navigator and other products or components with display functions. For implementation of the display device, please refer to the above embodiment of backlight module, and the repetition will not be described here.

According to the optical membrane, the backlight module and the display device according to embodiments of the present disclosure, the optical membrane includes the membrane body and the at least two lugs, and the lugs are connected to the two opposite sides of the membrane body and form the integral structure with the membrane body. The positions of the notches in the back plate correspond to the positions of the lugs of the optical membrane, and the lugs of the optical membrane overlap the notches of the back plate, thereby realizing the preliminary fixing of the optical membrane. The grooves are provided in the connection lines between the lugs and the membrane body, and the side walls of the grooves can reflect light to the display area, so as to enhance the reflection effect of the lights at the positions of the lugs, thereby improving the brightness uniformity at the edge of the display area and avoiding the problem of generating the shadows at the positions of the lugs.

Although embodiments of the present disclosure have been described, those of the skilled in the art can make additional changes and modifications to these embodiments once they know the basic inventive concepts. Therefore, the appended claims are intended to be interpreted as including embodiments and all changes and modifications that fall within the scope of the present disclosure.

Obviously, those of the skilled in the art can make various modifications and variations to embodiments of the present disclosure without departing from the spirit and scope of embodiments of the present disclosure. Thus, if these modifications and variations of embodiments of the present disclosure are within the scope of the claims of the present disclosure and their equivalents, the present disclosure is also intended to include these modifications and variations.

What is claimed is:

1. An optical membrane, comprising:
    a membrane body; and
    at least two lugs, connected to two opposite sides of the membrane body and forming an integral structure with the membrane body;
    wherein grooves are provided in connection lines between the lugs and the membrane body, and the grooves extend along the connection lines;
    wherein a depth of each of the grooves is ⅓ to ½ of a thickness of the membrane body.

2. The optical membrane according to claim 1, wherein side wall surfaces of sides of the grooves close to the membrane body are flush with side wall surfaces of corresponding sides of the membrane body.

3. The optical membrane according to claim 1, wherein the grooves are arranged to penetrate through the lugs along the connection lines.

4. The optical membrane according to claim 1, wherein the membrane body is rectangular, the two opposite sides of the membrane body are provided with the lugs, and each of the two opposite sides is connected to at least one of the lugs.

5. The optical membrane according to claim 1, wherein the membrane body is rectangular, three adjacent sides of the membrane body are provided with the lugs, and each of the three adjacent sides is connected to at least one of the lugs.

6. The optical membrane according to claim 1, wherein a width of each of the grooves in a direction perpendicular to the corresponding connection line is 0.1 mm to 0.5 mm.

7. The optical membrane according to claim 1, wherein the optical membrane is a prism sheet or a brightness enhancement sheet.

8. A backlight module, comprising: a back plate and the optical membrane according to claim 1; wherein,
    an edge of the back plate is provided with notches corresponding to the lugs of the optical membrane, and the lugs of the optical membrane overlap the notches of the back plate.

9. The backlight module according to claim 8, further comprising:
    a light guide plate, located on the back plate, wherein the light guide plate comprises a light incident surface and a light emergent surface, and the optical membrane is located on a side of the light emergent surface of the light guide plate; and
    a light bar, located on a side of the light incident surface of the light guide plate, wherein
    the lugs of the optical membrane are arranged at at least two opposite sides except that close to the light bar.

10. The backlight module according to claim 9, wherein the grooves in the lugs are located in a side facing the light guide plate; or, the grooves in the lugs are located in a side facing away from the light guide plate.

11. The backlight module according to claim 9, further comprising:
    an adhesive layer, located between the light guide plate and the optical membrane, wherein the adhesive layer is located on a side of the light guide plate close to the light bar.

12. The backlight module according to claim 9, further comprising:
    a diffusion sheet, located between the light guide plate and the optical membrane; and
    an adhesive frame, arranged around edges of the back plate, the light guide plate, the diffusion sheet and the optical membrane.

13. The backlight module according to claim 8, wherein the optical membrane comprises a prism sheet and a brightness enhancement sheet; and
    the grooves are arranged in the lugs of at least one of the prism sheet and the brightness enhancement sheet.

* * * * *